(12) United States Patent
Hreha

(10) Patent No.: US 12,297,334 B1
(45) Date of Patent: *May 13, 2025

(54) IMINE-BASED REACTIVE DILUENT FOR COMPOSITE MANUFACTURE

(71) Applicant: Systima Technologies, Inc., Mukilteo, WA (US)

(72) Inventor: Richard D. Hreha, Centerville, OH (US)

(73) Assignee: Systima Technologies, Inc., Mukilteo, WA (US)

( * ) Notice: Subject to any disclaimer, the term of this patent is extended or adjusted under 35 U.S.C. 154(b) by 212 days.

This patent is subject to a terminal disclaimer.

(21) Appl. No.: 17/751,802

(22) Filed: May 24, 2022

Related U.S. Application Data

(60) Provisional application No. 63/193,358, filed on May 26, 2021.

(51) Int. Cl.
  *C08G 73/00* (2006.01)
  *C08K 5/1535* (2006.01)

(52) U.S. Cl.
  CPC .................................. *C08K 5/1535* (2013.01)

(58) Field of Classification Search
  CPC ...................................................... C08G 73/00
  See application file for complete search history.

(56) References Cited

U.S. PATENT DOCUMENTS

| | | | |
|---|---|---|---|
| 3,945,999 | A | 3/1976 | Gruffaz et al. |
| 4,215,161 | A | 7/1980 | Seibold et al. |
| 10,662,329 | B1 * | 5/2020 | Hreha ............... C08L 83/04 |
| 11,572,351 | B1 * | 2/2023 | Hreha ............... C07D 307/34 |
| 2014/0242519 | A1 | 8/2014 | Sagehashi et al. |
| 2015/0251960 | A1 | 9/2015 | Yates et al. |
| 2015/0376153 | A1 | 12/2015 | Masuno et al. |
| 2020/0247971 | A1 | 8/2020 | Cavalli et al. |

FOREIGN PATENT DOCUMENTS

| | | |
|---|---|---|
| CN | 104193706 B | 10/2015 |
| CN | 108598395 A | 3/2018 |
| CN | 108892524 B | 7/2018 |
| CN | 112341234 A | 11/2020 |
| JP | 06271558 A | 9/1994 |
| WO | 2020088173 A1 | 9/2019 |

OTHER PUBLICATIONS

Sandor, "PBI (Polybenzimidazole): Synthesis, Properties and Applications", High Performance Polymers, vol. 2, No. 1, pp. 25-37, 1990.
Williams et al., "Thermal Protection Materials: Thermophysical Property Data", NASA Reference Publication 1289, 1992.
Brunovska et al., "Thermal Properties of Phthalonitrile Functional Polybenzoxazines", Thermochemica Acta Aug. 2000: 195-203.
Ogasawara et al., "Thermal Response and Ablation Characteristics of Carbon Fiber Reinforced Composite with Novel Silicon Containing Polymer MSP", Journal of Composite Materials, vol. 36, No. 2, pp. 143-157, 2002.
Abouel-Enein, "Polymeric and Sandwich Schiff's bases complexes derived from 4, 4'-Methylenedianiline", Journal of Thermal Analysis and Calorimetry, vol. 91, No. 3, pp. 929-936, 2008.
Parkar et al., "Ablation characteristics of an aromatic thermosetting copolyester/carbon fiber composite", Journal of Composite Materials, 46(15), pp. 1819-1830, 2011.
Zhizhko et al., "Oxo/Imido Heromethathesis Reactions Catalyzed by a Silica-Supported Tantalum Imido Complex", Organometallics 32, pp. 3611-3617, 2013.
Ali, "Palladium(II) and zinc(II) complexes of neutral [M2O2] donor Schiff bases derived from furfuraldehyde: Snythesis, characterization, fluorescence and corrosion inhibitors of ligands", Spectrochimica Acta Part A: Molecular and Biomolecular Spectroscopy 132, pp. 52-60, 2014.
Wen et al., "Synthesis and acidochromic, electrochromic properties of Schiff bases containing furan and triphenylamine units", Synthetic Metals 202, pp. 89-97, 2015.
Sabagh et al., "Thermochemical erosion and thermophysical properties of phenolic resin/carbon fiber/graphite hanocomposites", Journal of Reinforced Plastics & Composites, vol. 35(24), pp. 1814-1825, 2016.
Ahmed et al., "Thermal insulation by heat resistant polymers for solid rocket motor insulation", Journal of Composite Materials 46(13) pp. 1549-1559, 2011.
De Almedia et al., "Processing and characterization of ablative composites used in rock motors", Journal of Reinforced Plastics & Composites, vol. 33(16) pp. 1474-1484, 2014.

(Continued)

*Primary Examiner* — Catherine S Branch
*Assistant Examiner* — Huihong Qiao
(74) *Attorney, Agent, or Firm* — DINSMORE & SHOHL LLP

(57) ABSTRACT

A chemical formulation having at least one polymer resin and an imine-based reactive diluent. The polymer resin is selected from selected from bis-Schiff base resins, phthalonitrile resins, benzoxazine resins, polyimide resins, phenolic resins, bismaleimide resins, polyether sulfone, and polyether ether ketone. The imine-based reactive diluent has the structure of Formula (A):

Formula (A)

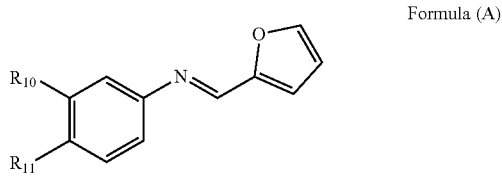

where $R_{10}$ is an aliphatic moiety or a hydrogen and $R_{11}$ is also an aliphatic moiety or a hydrogen. Associated methods of making a polymer composite include infusing the chemical formulation into a carbon fiber reinforcement to form an uncured resin embedded composite and curing the uncured resin embedded composite to form a fiber-reinforced polymer composite.

21 Claims, No Drawings

(56) References Cited

OTHER PUBLICATIONS

Natali et al., "Ablative properties of carbon black and MWNT/phenolic composites: A comparative study", Composites: Part A 43, pp. 174-182, 2012.
Nasa, "Game Changing Development Program, Potential Industry/Nasa Partnership in the Development and Assessment of High Performance Thermal Protection System Materials", NNH15ZOA005L. Mar. 2, 2015. Nspires. Jul. 3, 2015.
Zhang et al., "Addition-curable phthalonitrile-functionalized novolac resin", High Performance Polymers, 24(5), pp. 398-404, 2012.
Ransone et al., "Recent Advances in Carbon-Carbon Substrate Technology at Nasa Langley Research Center", https://ntrs.nasa.gov/search.jsp?R=19930003267, Feb. 4, 2019.

\* cited by examiner

IMINE-BASED REACTIVE DILUENT FOR COMPOSITE MANUFACTURE

CROSS-REFERENCE TO RELATED APPLICATIONS

This application claims priority to U.S. Provisional Application 63/193,358, filed May 26, 2021, which is incorporated by reference herein in its entirety.

FIELD OF INVENTION

Embodiments of the present disclosure generally relate to chemical formulations that include at least one polymer resin and an imine-based reactive diluent and methods of making polymer composites utilizing the same.

BACKGROUND

In composite manufacturing, the selection of resin with suitable processing properties may be considered as important as the ultimate cured resin mechanical and thermal properties. Polymer resin may have excellent cured properties that can produce a high performance polymer composite, but poor processing characteristic such as a high melt viscosity make such resin impractical for adoption for composite manufacturing. That is, selection of resins for use is making polymer composites is limited by the workability and processing characteristics of the resin. One approach to modify the processing characteristics of a resin is to include a solvent to shift the processing characteristics to a more desirable range. However, inclusion of a solvent with the resin in accordance with present industry practice necessitates an additional processing step of solvent removal before curing the resin infused composite.

SUMMARY

Accordingly, a need exists for resin formulations with improved rheology, such as a sufficiently low melt viscosity, and that remain relatively stable within a workable time and temperature processing window to allow the resin to be processed into a product form efficiently and economically. The alternative approach in accordance with the present disclosure leveraging the addition of an imine-based reactive diluent reactive diluent into the polymer resin to generate the chemical formulation of the present disclosure serving as the resin for polymer composite manufacture overcomes these noted deficiencies. Specifically, the present embodiments address these needs by providing chemical formulations and methods of making polymer composites utilizing the chemical formulation.

Embodiments of the present disclosure relate to chemical formulations comprising at least one polymer resin, where the polymer resin selected from selected from the group consisting of bis-Schiff base resins, phthalonitrile resins, benzoxazine resins, polyimide resins, phenolic resins, bismaleimide resins, polyether sulfone, and polyether ether ketone; and an imine-based reactive diluent comprising the structure of Formula (A):

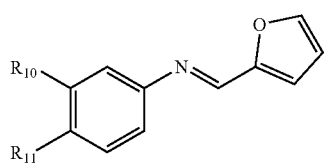

Formula (A)

wherein $R_{10}$ consists of an aliphatic moiety or a hydrogen, and $R_{11}$ consists of an aliphatic moiety or a hydrogen.

Further embodiments of the present disclosure relate to methods of making a polymer composite comprising (a) infusing a chemical formulation into a carbon fiber reinforcement to form an uncured resin embedded composite and (b) curing the uncured resin embedded composite at a first elevated temperature under vacuum or pressure to form a fiber-reinforced polymer composite. The chemical formulation comprises at least one polymer resin, where the polymer resin selected from selected from the group consisting of bis-Schiff base resins, phthalonitrile resins, benzoxazine resins, polyimide resins, phenolic resins, bismaleimide resins, polyether sulfone, and polyether ether ketone; and an imine-based reactive diluent comprising the structure of Formula (A):

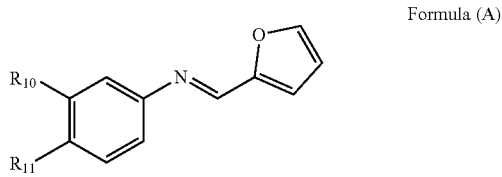

Formula (A)

wherein $R_{10}$ consists of an aliphatic moiety or a hydrogen, and $R_{11}$ consists of an aliphatic moiety or a hydrogen.

Yet further embodiments of the present disclosure relate to methods of making a polymer composite comprising (a) infusing a chemical formulation into a carbon fiber reinforcement to form an uncured resin embedded composite, (b) curing the uncured resin embedded composite at a first elevated temperature under vacuum or pressure to form a fiber-reinforced polymer composite, and (c) heating the fiber-reinforced polymer composite at a second elevated temperature under inert atmosphere to carbonize the fiber-reinforced polymer composite and form a carbon-carbon composite, wherein the second elevated temperature is greater than the first elevated temperature. The chemical formulation comprises at least one polymer resin, where the polymer resin selected from selected from the group consisting of bis-Schiff base resins, phthalonitrile resins, benzoxazine resins, polyimide resins, phenolic resins, bismaleimide resins, polyether sulfone, and polyether ether ketone; and an imine-based reactive diluent comprising the structure of Formula (A):

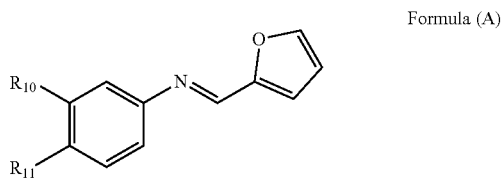

Formula (A)

wherein $R_{10}$ consists of an aliphatic moiety or a hydrogen, and $R_{11}$ consists of an aliphatic moiety or a hydrogen.

DETAILED DESCRIPTION

Embodiments of the present disclosure generally relate to an imine-based reactive diluent employed for composite manufacture and associate methods of making a polymer composite utilizing the same. Specifically, embodiments of the present disclosure relate to chemical formulations which include at least one polymer resin and an imine-based reactive diluent comprising the structure of Formula (A):

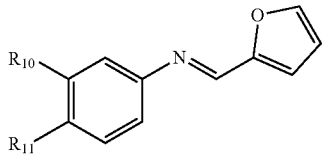

Formula (A)

where $R_{10}$ consists of an aliphatic moiety or a hydrogen, and $R_{11}$ consists of an aliphatic moiety or a hydrogen.

Imines are compounds having the general structure $R_2C=NR'$. Imines are known to be useful intermediates in making catalysts, dyes, and for wide variety of photo-chemical applications. However, the benefits of using imines as a reactive diluent in making polymer composites are generally unknown.

Any suitable aliphatic moiety or hydrogen may be chosen for $R_{10}$ and $R_{11}$, which may vary based on the desired application of use. In some embodiments, $R_{10}$, $R_{11}$, or both may contain at least one of a hydrogen atom, an oxygen group, a methylene group, an ethylene group, an imine group, amide group, a dialkyl methylene group, an isopropyl group, a trifluoromethyl group, a hexafluoroisopropyl group, an ether group, a sulfonyl group, a sulfur group, a t-butyl group, an alkyne group, or an ethyl hexyl group. It should be understood that a "group" is used to refer to a moiety containing at least one atom of the noted type. For instance, an "oxygen group" is used to refer to any moiety containing oxygen, such as a single oxygen atom or a complex arrangement containing one or many oxygen atoms.

In some embodiments, the imine-based reactive diluent may be selected from one or more of Formula (B), Formula (C), Formula (D), Formula (E), Formula (F), Formula (G), Formula (H), Formula (J), or Formula (K):

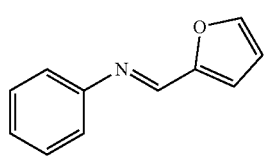

Formula (B)

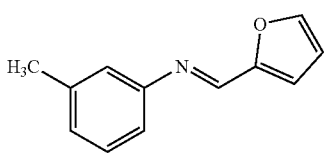

Formula (C)

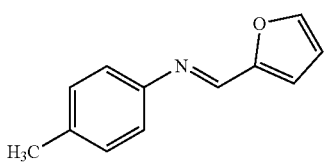

Formula (D)

Formula (E)

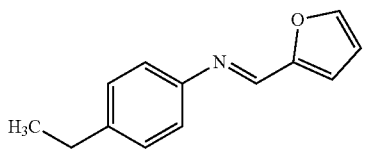

Formula (F)

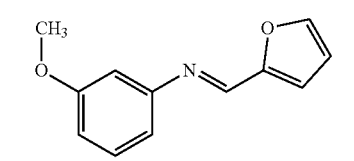

Formula (G)

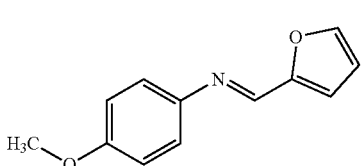

Formula (H)

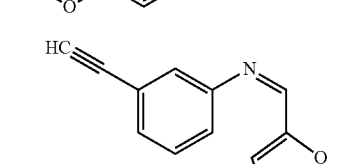

Formula (J)

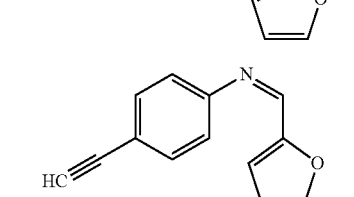

Formula (K)

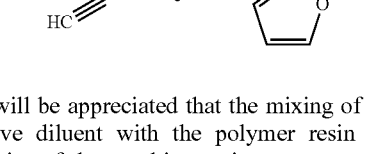

It will be appreciated that the mixing of the imine-based reactive diluent with the polymer resin can reduce the viscosity of the resulting resins at processing temperature and facilitates infusion of resins into reinforcement fibers when making fiber-reinforced polymer composites. In some embodiments, the chemical formulation comprises from 5 weight percent (wt. %) to 55 wt. % of the imine-based reactive diluent. In various embodiments, the chemical formulation comprises from 5 wt. % to 50 wt. %, 5 wt. % to 40 wt. %, 5 wt. % to 30 wt. %, 10 wt. % to 55 wt. %, 15 wt. % to 55 wt. %, 25 wt. % to 55 wt. %, or 15 wt. % to 45 wt. % of the imine-based reactive diluent. It will be appreciated that up to the remainder of the chemical formulation may consist of the polymer resin. For example, if the chemical formulation comprises from 15 wt. % to 50 wt. % of the imine-based reactive diluent it may comprise 50 wt. % to 85 wt. % of the polymer resin. It will be appreciated that increasing the percentage of the imine-based reactive diluent lowers the viscosity of the chemical formulation. Further, increasing the percentage of the imine-based reactive diluent may increase toughness of the resulting composite at the expense of a decreased char yield.

In some embodiments, the chemical formulation comprises up 5 wt. % of fillers such as carbon black or graphite, reinforcements, pigments, stabilizers, or other processing additives exclusive of the imine-based reactive diluent, based on the total weight of the chemical formulation. In some embodiments, the chemical formulation may contain the imine-based reactive diluent in accordance with Formula (I), at least one polymer resin, and less than or equal to 3 wt. %, less than 2 wt. %, or less than 1 wt. % of fillers, reinforcements, pigments stabilizers, or other processing additives exclusive of the imine-based reactive diluent, based on the total weight of the chemical formulation. In some embodiments, the chemical formulation may not contain, or may not contain more than trace amounts of fillers, reinforcements, pigments stabilizers, or other processing additives exclusive of the imine-based reactive diluent.

It is noted that unlike conventional reactive diluents used in the industry which are generally liquid at room temperature, the currently disclosed imine-based reactive diluents may exist as a solid at room temperature while retaining low melting points and low melt viscosities. For purposes of the present disclosure a low melting point is considered to be less than 100° C. The imine-based reactive diluents generally have a melting point in the range of 30 to 75° C., but it will be appreciated that selection of $R_{10}$ and $R_{11}$ groups allow for imine-based reactive diluents which exist as a liquid below room temperature or have a greater melting point than 75° C. The versatility afforded for chemical processing by providing the imine-based reactive diluent as a solid while concurrently having a low melting point and low melt viscosity is beneficial. As used herein, "melt viscosity" refers to the measurement of the flow of a melted material, which may be measured based on the resistance to deformation as a function of shear rate or stress with dependence on time and temperature.

In one or more embodiments, the polymer resin is a thermosetting resin. In various embodiments, the polymer resin is comprises one or more bis-Schiff base resins, phthalonitrile resins, benzoxazine resins, polyimide resins, phenolic resins, and bismaleimide resins. Each of these resin types will be addressed and disclosed individually in further detail.

Bis-Schiff base resins generally comprise the structure of Formula (I):

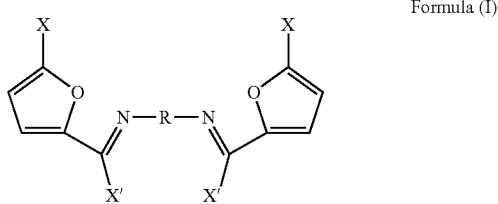

Formula (I)

where R is an aromatic moiety, and X and X' may both or independently comprise aromatic, aliphatic moieties, or a hydrogen. The aromatic moiety may be any suitable constituent containing a cyclic, ring-shaped functional group. The aliphatic moiety may be any saturated or unsaturated, straight or branched open-chain compound. In some embodiments, X, X', or both X and X' may be a hydrogen atom.

Any suitable aromatic moiety may be chosen for R, which may vary based on the desired application of use. In some embodiments, R may contain at least one of a phenyl group, a naphthyl group, an ether group, a sulfur group, a sulfonyl group, an imine group, an amide group, a methylene group, a dialkyl methylene group, an isopropyl group, a trifluoromethyl group, a hexafluoroisopropyl group, a carbonyl group, a benzyl group, or combinations of these. In some embodiments, R may be an aromatic moiety having the structure of at least one of Formula (II) or Formula (III):

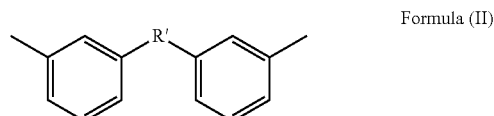

Formula (II)

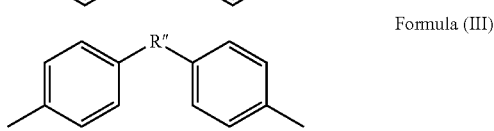

Formula (III)

where R' and R" may be, for instance, an oxygen group, an imine group, an amide group, a methylene group, a dialkyl methylene group, an isopropyl group, a trifluoromethyl group, a hexafluoroisopropyl group, an ether group, a sulfonyl group, a sulfur group.

It should be understood that a "group" is used to refer to a moiety containing at least one atom. For instance, an "oxygen group" is used to refer to any moiety containing oxygen, such as a single oxygen atom or a complex arrangement containing one or many oxygen atoms. In any of the formulas depicted throughout this disclosure, an unconnected bond "–X" refers to an open covalent bond, which may be a single, double, or even a triple bond between that constituent and another molecule.

In some embodiments, R may contain one or more of Formula (IV), Formula (V), Formula (VI), Formula (VII), Formula (VIII), Formula (IX), Formula (X), Formula (XI), Formula (XII), Formula (XIII), Formula (XIV), Formula (XV), Formula (XVI), Formula (XVII), Formula (XVIII), Formula (XIX), Formula (XX), Formula (XXI), Formula (XXII), Formula (XXIII), Formula (XXIV), Formula (XXV), Formula (XXVI), Formula (XXVII), Formula (XXVIII), Formula (XXIX), Formula (XXX), or Formula (XXXI):

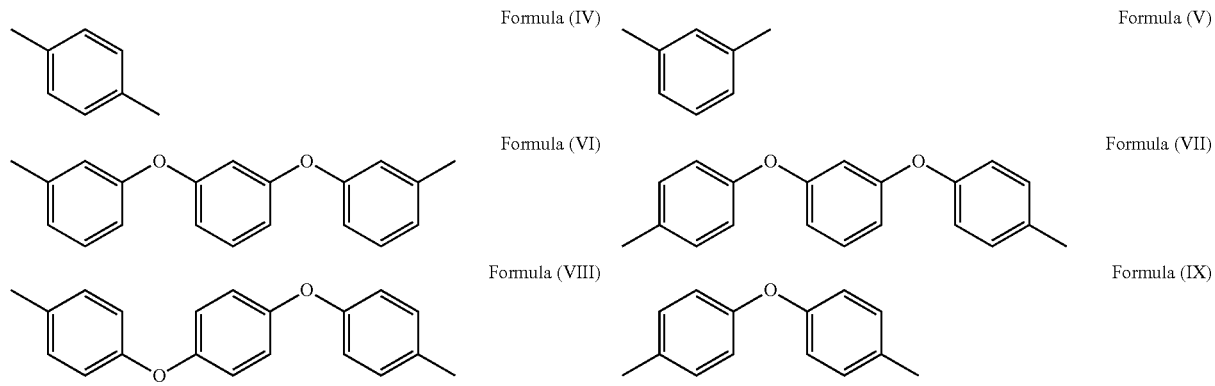

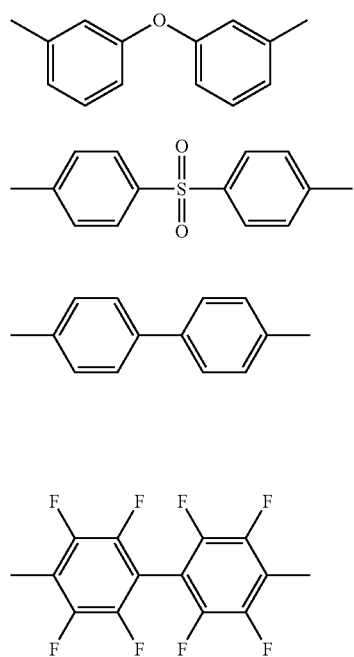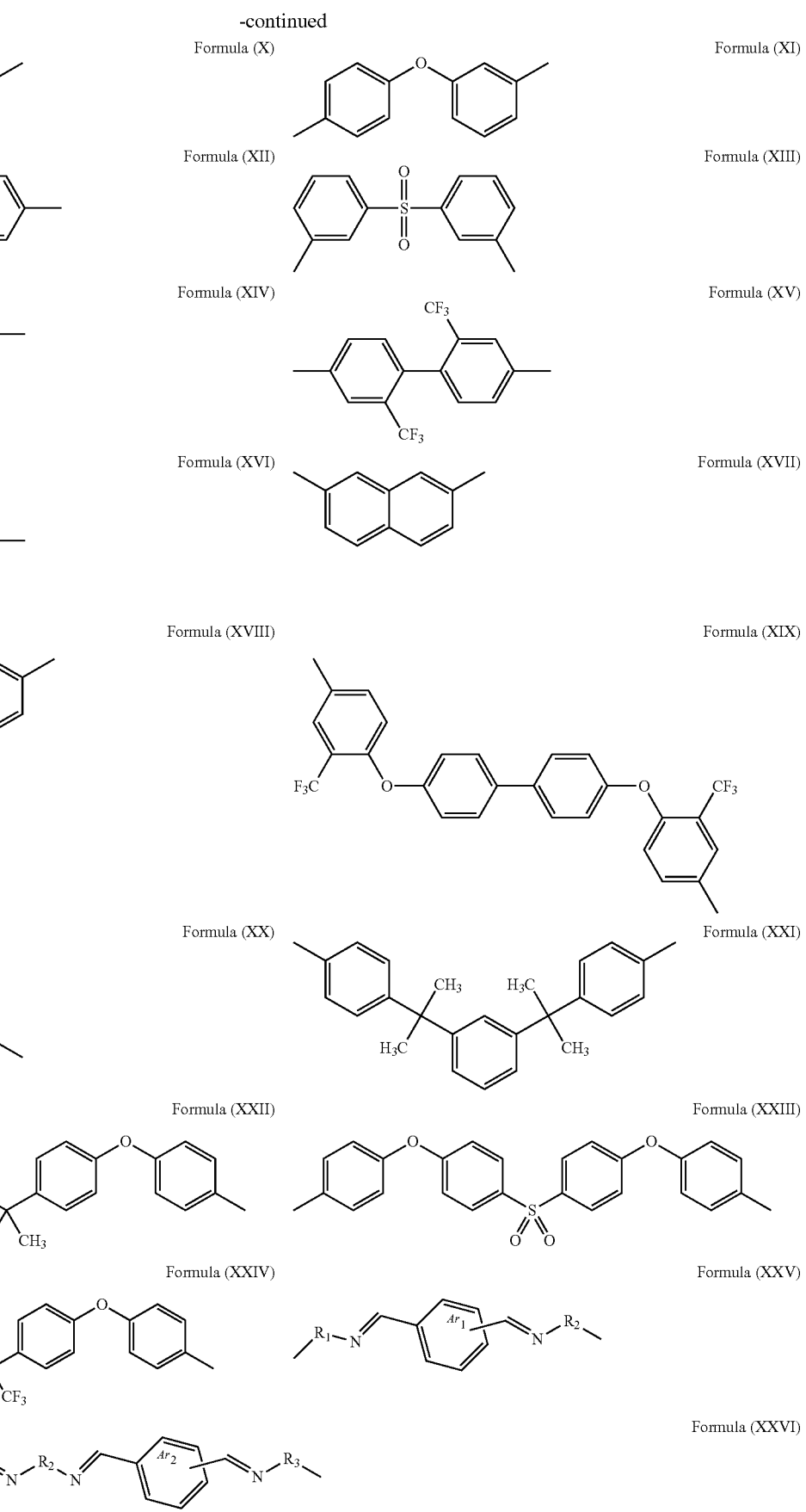

Formula (XXVII)

Formula (XXVIII)
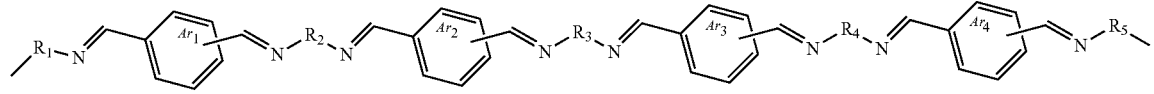

Formula (XXIX)
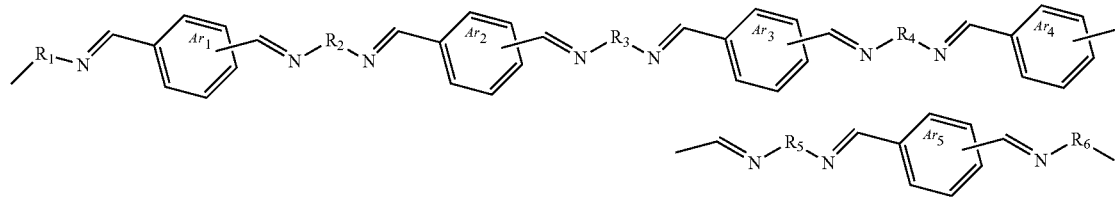

Formula (XXX)
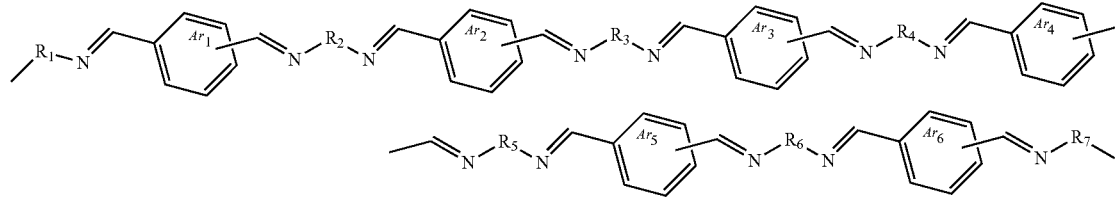

Formula (XXXI)
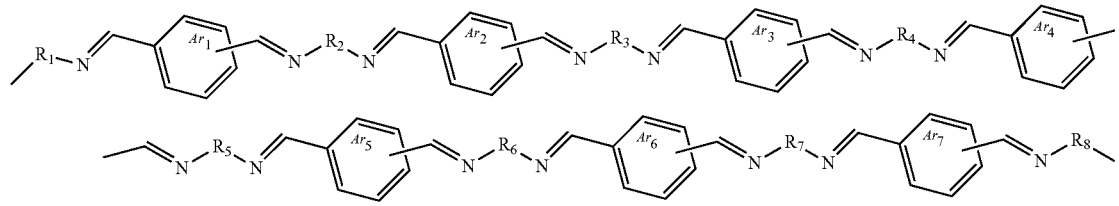

In one or more embodiments, for Formula (XXV), Formula (XXVI), Formula (XXVII), Formula (XXVIII), Formula (XXIX), Formula (XXX), or Formula (XXXI), $R_1$, $R_2$, $R_3$, $R_4$, $R_5$, $R_6$, $R_7$, and $R_8$ are each independently selected from Formula (IV), Formula (V), Formula (VI), Formula (VII), Formula (VIII), Formula (IX), Formula (X), Formula (XI), Formula (XII), Formula (XIII), Formula (XIV), Formula (XV), Formula (XVI), Formula (XVII), Formula (XVIII), Formula (XIX), Formula (XX), Formula (XXI), Formula (XXII), Formula (XXIII), and Formula (XXIV), and the aromatic moieties $Ar_1$, $Ar_2$, $Ar_3$, $Ar_4$, $Ar_5$, $Ar_6$, and $Ar_7$ may be meta-substituted or para-substituted. It is noted that Formula (XXVIII), Formula (XXIX), Formula (XXX), and Formula (XXXI) are illustrated in broken form for clarity with the broken bonds represented by a tilde across the bond.

Example techniques and procedures for production of the bis-Schiff base resin is provided in U.S. Pat. Nos. 10,501,578 and 11,028,194, both of which are incorporated by reference in their entirety.

Benzoxazine resins are cured polymerization products derived from benzoxazine monomers where benzoxazines are bicyclic heterocyclic compounds containing one oxygen and one nitrogen atom in a doubly unsaturated six-member ring, specifically a 1,3-oxazine ring, fused with a benzene ring. Benzoxazines are the product of condensation between an amine, a phenol and formaldehyde. It will be appreciated that the wide availability and low-cost of starting materials in the form of amines, phenols and formaldehyde, as well as ease of preparation with a one-pot reaction renders a diverse array of benzoxazines which are available. Example commercially available benoxazine resins are provided as Formula (XXXII), Formula (XXXIII), Formula (XXXIV), and Formula (XXXV). Specifically, Formula (XXXII) represents a Bisphenol-A based benzoxazine commercially available as ARALDITE® MT 35600, Formula (XXXIII) represents a Bisphenol-F based benzoxazine commercially available as ARALDITE® MT 335700 BF-BXZ, Formula (XXXIV) represents a Thiodiphenol based benzoxazine commercially available as ARALDITE® MT 35900, and Formula (XXXV) represents a Dicyclopentadiene based benzoxazine commercially available as ARALDITE® MT 36000 all produced by Huntsman Corporation (The Woodlands, Texas). However, it will be appreciated that further or alternative benzoxazine resins known to those skilled in the art are equally envisioned as being utilized as the polymer resin.

Formula (XXXII)

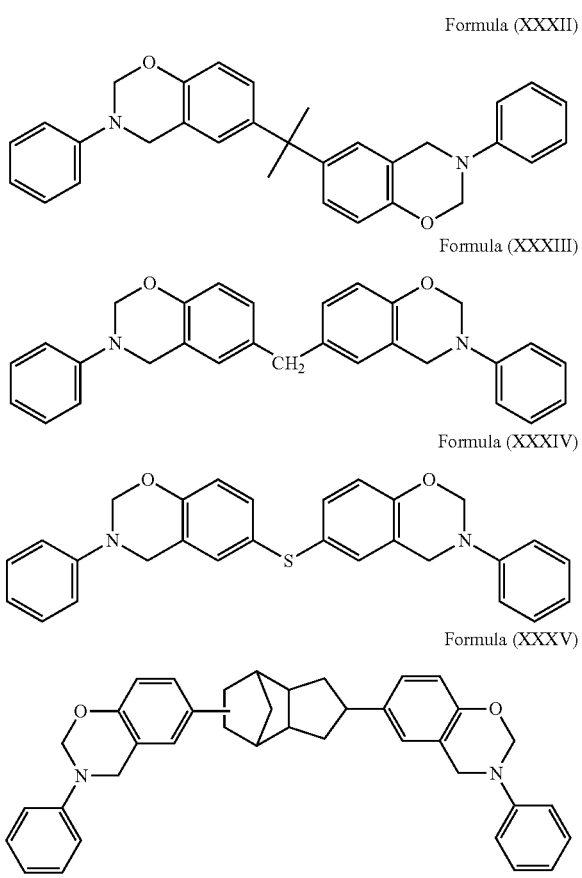

Formula (XXXIII)

Formula (XXXIV)

Formula (XXXV)

Phthalonitrile resins are a class of thermoset resins which exhibit high thermal stability and oxidative stability. Further, phtalonitrile resins demonstrate desirable high-temperature properties with high thermal stability with a decomposition temperature of the cured resin approaching 500° C. (930° F.) in air and a high char yield of about 80 to 90% when pyrolyzed at 1000° C. under inert conditions. Phthalonitriles resins can be prepared by nitro-displacement of nitro-phthalonitriles with phenoxyphenols in the presence of a base. Alternatively, oligomeric ether-aromatic ketone-containing phthalonitriles may be synthesized from a bisphenol and chlorobenzophenone with bisphenol in excess to generate a diphenolate which is then end-capped with phthalonitrile to produce the oligomeric phthalonitrile resin. Example phtalonitrile resins are provided as Formula (XXXVI), Formula (XXXVII), Formula (XXXVIII), and Formula (XXXIX). Specifically, Formula (XXXVI) represents a Bisphenol A diphthalonitrile, Formula (XXXVII) represents a Resorcinol Diphthalonitrile, Formula (XXXVIII) represents a Poly{[bis (4-bromophenyl) sulfone]-alt-[bisphenol-A]}diPN, and Formula (XXXIX) represents a Poly{[dibromobenzophenone]-alt-[bisphenol-A]}diPN. However, it will be appreciated that further or alternative phtalonitrile resins known to those skilled in the art are equally envisioned as being utilized as the polymer resin.

Formula (XXXVI)

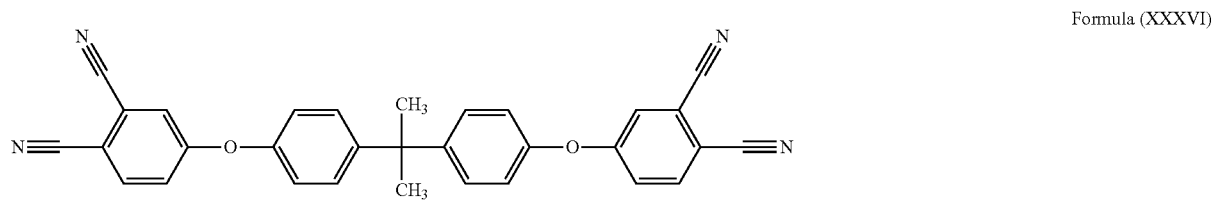

Formula (XXXVII)

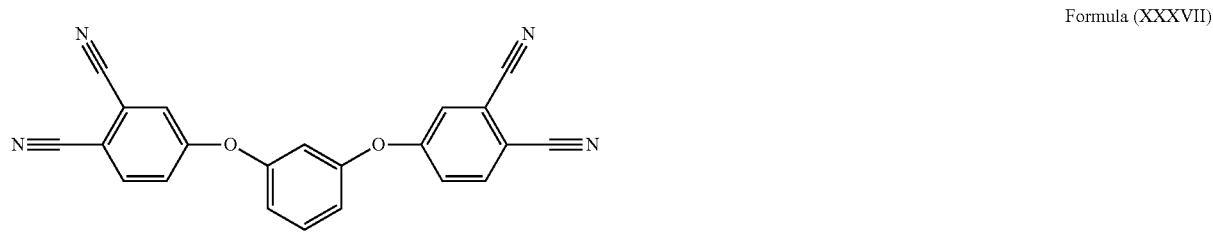

Formula (XXXVIII)

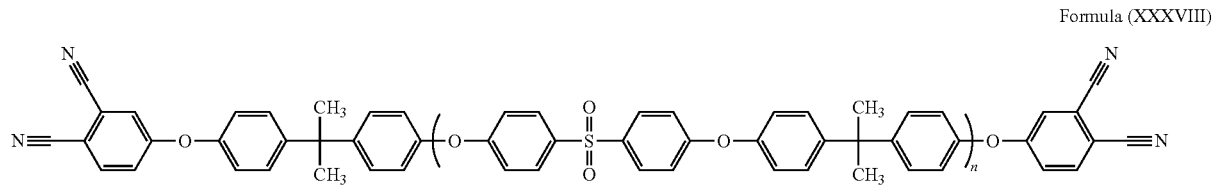

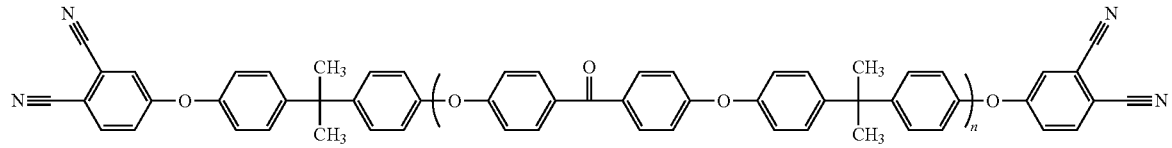

Formula (XXXIX)

Polyimide resins generate polyimides (PI) which are a class of high performance plastics containing imide groups. Polyimide resins are prepared by condensation polymerization of aromatic primary diamines and aromatic tetracarboxylic dianhydrides. The aromatic ring structure along the polymer backbone provides the polyimide resin's thermal, mechanical, and chemical properties. A classic polyimide is Kapton® which is commercially available from E. I. du Pont de Nemours and Company (Wilmington, Delware), which is produced by condensation of pyromellitic dianhydride and 4,4'-oxydianiline. However, it will be appreciated that further or alternative polyimide resins known to those skilled in the art are equally envisioned as being utilized as the polymer resin.

Phenolic resins are synthetic polymers obtained by the reaction of phenol or substituted phenol with formaldehyde. There are two types of phenolic resins, phenolic novolac resins and phenolic resol resins, depending on the conditions used to create the polymer. Phenolic novolac resins are phenol-formaldehyde resins with a formaldehyde to phenol molar ratio of less than one. Conversely, phenolic resol resins are phenol-formaldehyde resins made with a formaldehyde to phenol ratio of greater than one (usually around 1.5). There are a variety of phenolic resins known to those skilled in the art which are commercially available and they are each envisioned as being utilized as the polymer resin.

Bismaleimide resins can be synthesized by condensation of phthalic anhydride with an aromatic diamine at molar ratio 2:1, which yields bismaleimide, followed by subsequent Michael addition of more diamine to the double bond at the ends of the bismaleimide. The addition polymerization is typically carried out with an excess of bismaleimide to produce maleimide end-capped resins. Bismaleimide resins are commercially available from Huntsman Corporation (The Woodlands, Texas) under the trade names KERIMID® and MATRIMID®. However, it will be appreciated that further or alternative bismaleimide resins known to those skilled in the art are equally envisioned as being utilized as the polymer resin.

In one or more embodiments, the polymer resin is a thermoplastic resin. In various embodiments, the polymer resin comprises polyether sulfone (PES), polyether ether ketone (PEEK), a thermoplastic polyimide, or a thermoplastic polyetherimide.

The inclusion of the imine-based reactive diluent comprising the structure of Formula (A) within the chemical formulation reduces the melting point and viscosity of the polymer resin. The reduction in the melting point and viscosity of the chemical formulation relative to the polymer resin in the absence of the imine-based reactive diluent improves the processability of the polymer resin.

In one or more embodiments, the chemical formulation comprises a viscosity of less than 10,000 cP (10 Pa-s) at 65° C. The viscosity may be measured by rotational rheometry by acquiring viscosity versus temperature curves on a parallel plate rheometer, commercially available from TA Instruments (New Castle, DE) at a controlled strain of 0.01% and an angular frequency of 10.00 radians per second (rad/s) by heating samples at a rate of 2° C. per minute to the isothermal temperature specified. In various embodiments, the chemical formulation comprises a viscosity of less than 7,500 cP (7.5 Pa-s), less than 5,000 cP (5 Pa-s), less than 2,500 cP (2.5 Pa-s), less than 1,000 cP (1 Pa-s), or less than 200 cP (0.2 Pa-s) at 65° C.

In one or more embodiments, the chemical formulation comprises a viscosity of less than 1,000 cP (1 Pa-s) at 100° C. In various embodiments, the chemical formulation comprises a viscosity of less than 750 cP (0.75 Pa-s) at 100° C., less than 500 cP (0.5 Pa-s) at 100° C., less than 300 cP (0.3 Pa-s) at 100° C., less than 200 cP (0.2 Pa-s) at 100° C., or less than 100 cP (0.1 Pa-s) at 100° C. at 65° C.

In one or more embodiments, the viscosity of the chemical formulation may be 1 to 2500 Pa-s at 30° C., 0.1 to 10 Pa-s at 65° C., and 0.01 to 0.55 Pa-s at 100° C. For example, the viscosities achievable at various temperatures with a chemical formulation formed from a Bis-Schiff base resin in accordance with Formula XL presented infra and 18% by weight of the imine-based reactive diluent comprising the structure of Formula (B) are 1,700,000 cP (1700 Pa-s) at 30° C., 2,250 cP (2.25 Pa-s) at 65° C., and 120 cP (0.12 Pa-s) at 100° C. Further, the viscosities achievable with a chemical formulation formed from a Bis-Schiff base resin in accordance with Formula XL and the imine-based reactive diluent comprising the structure of Formula (B) at a 1:1 weight ratio are 1,700 cP (17 Pa-s) at 30° C., 160 cP (0.16 Pa-s) at 65° C., and 50 cP (0.05 Pa-s) at 100° C.

Formula (XL)

Having generally described the chemical formulation, methods of utilizing the chemical formulation to make polymer composites are provided. In one or more embodiments, a method of making a polymer composite comprises infusing the chemical formulation as previously described into a carbon fiber reinforcement to form an uncured resin embedded composite and curing the uncured resin embedded composite at a first elevated temperature under vacuum or pressure to form a fiber-reinforced polymer composite.

The carbon fiber reinforcement may be chosen based on the desired application of use. In various embodiments, the carbon fiber reinforcement may be carbon fiber, random carbon mats, carbon fiber scrims, chopped carbon fibers, carbon fiber knits, unidirectional carbon fiber plies, three-dimensional carbon fiber weaves, three-dimensional carbon fiber preforms, plain weave fabric, twill fabrics, felts, stitched fabrics, tufted fabrics, or combinations thereof.

The carbon fiber reinforcement may be a unidirectional fibrous or a woven fabric material, and in some embodiments, may be arranged in a 0° and 90° or 0°, 45°, and 90° orientation between layers to provide structural support or may be in any other layup or laminate arrangement known in the industry. The carbon fiber reinforcement may be in a braided, woven, plain weave, twill weave, satin weave, in a symmetric or non-symmetric laminate stack, in any other known configuration, or in any combination of configurations. Depending on the industrial application and the part thickness desired, it may be desirable to use multiple layers of the carbon fiber reinforcement to form a layup.

In one or more embodiments, the uncured resin embedded composite may be positioned under a vacuum enclosure. Specifically, the uncured resin embedded composite may be positioned on a substrate in a lay-up of the desired geometry and layer configuration. It will be appreciated by one skilled in the art that a lay-up process is a molding process for composite materials, in which the generated composite is obtained by overlapping a specific number of different layers of a reinforcement material along with a thermosetting polymer resin. Further, it will be appreciated that in various embodiments the laying-up or positioning of the uncured resin embedded composite on the substrate may be a dry lay-up process or a wet lay-up process. A wet lay-up processes utilizes pre-impregnated carbon fiber reinforcement in contrast to a dry lay-up process where the carbon fiber reinforcement is placed on the substrate with the chemical formulation serving as the resin added once the carbon fiber reinforcement is positioned. In the case of a dry lay-up process it will be appreciated that infusion of the chemical formulation serving as the resin into the carbon fiber reinforcement to form the uncured resin embedded composite occurs after the lay-up process and as such the carbon fiber reinforcement is positioned on the substrate in lieu of the uncured resin embedded composite. As such, the difference between a wet lay-up process and a dry lay-up process generally amounts to whether infusing the chemical formulation into the carbon fiber reinforcement to form an uncured resin embedded composite occurs before or after the carbon fiber reinforcement is arranged into the lay-up.

In one or more embodiments, infusing the chemical formulation into the carbon fiber reinforcement to form the uncured resin embedded composite is conducted with a pressure differential between the carbon fiber reinforcement and a source of the chemical formulation. In one or more embodiments, a positive pressure is applied to drive the chemical formulation serving as the resin into the carbon fiber reinforcement. In further embodiments, a vacuum is applied at the carbon fiber reinforcement to draw the chemical formulation serving as the resin into the carbon fiber reinforcement. Generalized methods of infusing a thermosetting polymer resin or thermoplastic resin into the carbon fiber reinforcement are generally known to those skilled in the art and as such, for conciseness, further details of the infusion process are omitted. Examples of such infusion methods include Resin Transfer Molding (RTM) and Vacuum Assisted Resin Transfer Molding (VARTM).

Embodiments of the method of method of making a polymer composite include curing the uncured resin embedded composite at a first elevated temperature under vacuum or pressure to form a fiber-reinforced polymer composite. The uncured resin embedded composite formed from the carbon fiber reinforcement infused with the chemical formulation is cured under vacuum or external pressure to both compress the uncured resin embedded composite and draw air out of the uncured resin embedded composite. Drawing or forcing the air out of the uncured resin embedded composite allows the chemical formulation to maximally fill any voids in the uncured resin embedded composite. Specifically, in one or more embodiments a vacuum is applied to the vacuum enclosure to evacuate air from the uncured resin embedded composite. In one or more embodiments, the vacuum enclosure is formed by sealing or adhering a vacuum bag to the substrate such that the assembly is isolated from the surrounding atmosphere. Generation of a vacuum environment within the vacuum enclosure by evacuating air from within the vacuum enclosure ensures that the uncured resin embedded composite is substantially fully evacuated of air prior to elevating the temperature to the first elevated temperature to cure the chemical formulation serving as the resin.

In one or more embodiments, a breather cloth is placed over the uncured resin embedded composite when placed under the vacuum enclosure. The breather cloth generally allows passage of gases from the uncured resin embedded composite to a vacuum port where air and gases are removed from the vacuum enclosure. In the absence of a breather cloth the vacuum bag of the vacuum enclosure may be pressed against the uncured resin embedded composite thereby impeding passage of gases to the vacuum port. Breather cloths are commonly utilized with vacuum infusion and the implementation and placement of breather cloths is known to those skilled in the art and may alternatively be referenced as a bleeder cloth. In one or more embodiments, the breather cloth is formed from a polymer fabric. An example material for formation of the breather cloth is Ultraweave 606, a woven nylon mat, which is commercially available from Airtech International, Huntington Beach, California.

It will be appreciated that the strength of the vacuum generated within the vacuum enclosure is desirably as great as possible. For purposes of this disclosure, indication that a vacuum is 0 inches of mercury (inHg) indicates that no vacuum is applied and indication that a vacuum is 29.92 inHg indicates that a complete or perfect vacuum is achieved. In various embodiments, the vacuum applied to the vacuum enclosure to evacuate air from within the vacuum enclosure is 25 inHg or greater, 26 inHg or greater, 27.5 inHg or greater, or 29 inHg or greater.

It will be appreciated that in one or more embodiments compressive forces are applied to the assembly of the carbon fiber reinforcement embedded with the chemical formulation by virtue of the assembly being under the vacuum enclosure with an applied vacuum. Specifically, the applied vacuum to the vacuum enclosure results in the vacuum enclosure attempting to achieve a minimal interior volume which results in the vacuum bag collapsing toward the uncured resin embedded composite and compressing the assembly there between.

In one or more embodiments an external pressure is applied to the uncured resin embedded composite to minimize volume and force the bis-Schiff base resin into the accessible void space in the uncured resin embedded composite before initiation of resin curing. In one or more embodiments the external pressure may be applied from a top portion of a mold tool which mates with the substrate. In one or more embodiments, the process of heating the uncured resin embedded composite to the first elevated temperature may be completed in an autoclave. As such, the autoclave may be pressurized to compress the vacuum enclosure and force residual resin into the carbon fiber reinforcement. In one or more embodiments, the external pressure that is applied to the assembly of the carbon fiber reinforcement infused with the chemical formulation forming the uncured resin embedded composite is applied in the range of 50 pounds per square inch (psi) to 500 psi. For example, in various embodiments, the external pressure is 50 to 300 psi, 100 to 500 psi, 100 to 300 psi, 150 to 250 psi, or approximately 200 psi.

As indicated supra, the chemical formulation serving as the resin in the uncured resin embedded composite is cured by heating the uncured resin embedded composites to a first elevated temperature. The specific curing temperature and time is specific to the polymer resin and imine-based reactive diluent utilized in the chemical formulation. Example curing times and temperatures for polymer resins are provide in Table 1 provided infra with MG 0812 being a representative bis-Schiff base resins along with generalized parameters for phenolic resin and benzoxazine resin. It is noted that MG 0812 is manufactured by Cornerstone Research Group (Miamisburg, OH). Further, various phenolic resins are commercially available as the Durite line of resins from Hexion (Columbus, Ohio) and the Phenalloy line of resins from Dynachem (Westerville, Illinois). The curing time and temperatures for example chemical formulations are also provided in Table 1.

TABLE 1

Example Resin Curing Times and Temperatures

| Resin | Curing Temperature | Curing Time |
| --- | --- | --- |
| MG 0812 | 250° C. | 120 minutes |
| Phenolic resin | 165° C. | 60 minutes |
| Benzoxazine resin | 200° C. | 120 minutes |
| Formula (XL) and Formula (B) in 1:1 weight ratio | 215° C. | 120 minutes |
| Formula (XL) and 18 wt. % Formula (B) | 215° C. | 120 minutes |

In one or more embodiments, the fiber-reinforced polymer composite is removed from the vacuum enclosure and separated from any molds or other components utilized in the shaping, infusion, and/or curing process.

In one or more embodiments, the method of making a polymer composite further includes heating the fiber-reinforced polymer composite at a second elevated temperature to form a carbon-carbon composite. The second elevated temperature is greater than the first elevated temperature. Heating the fiber-reinforced polymer composite at the second elevated temperature carbonizes the cured chemical formulation in the fiber-reinforced polymer composite. In one or more embodiments, heating the fiber-reinforced polymer composite at the second elevated temperature to carbonize the fiber-reinforced polymer composite is completed in an inert gas environment, alternatively referenced as an inert atmosphere. An inert gas environment is an atmosphere formed from substantially only one or more inert gases. In various embodiments the inert gas provided in the inert gas environment may be nitrogen or argon. In one or more embodiments, the inert gas environment comprises a nitrogen atmosphere of at least 99% purity by volume. In one or more embodiments, the inert gas environment comprises an argon atmosphere of at least 99% purity by volume. Specifically, the air atmosphere in the oven or autoclave where carbonization is completed may be evacuated and replaced with the inert gas environment, such as a nitrogen gas atmosphere, for heating to carbonize the cured chemical formulation in the fiber-reinforced polymer composite. The inert gas environment results in carbonization of the cured chemical formulation serving as the resin, but protects the resulting carbonized material from oxidation and further decomposition to carbon dioxide.

In one or more embodiments, carbonization is achieved by heating the fiber-reinforced polymer composite to a second elevated temperature of at least 800° C. In various further embodiments, the carbonization is achieved by heating the fiber-reinforced polymer composite to a second elevated temperature of between 800° C. and 2200° C., 900° C. and 2200° C., 800° C. and 2000° C., 900° C. and 2000° C., 1000° C. and 2200° C., or 1000° C. and 2000° C. For example, the fiber-reinforced polymer composite may be heated to a second elevated temperature of 1200° C. under a constant flow of argon gas to form the carbon-carbon composite.

In one or more embodiments, the fiber-reinforced polymer composite is held at the second elevated temperature to carbonize the cured chemical formulation for at least 1 hour. In various further embodiments, the hold time at the second elevated temperature is at least 90 minutes, at least 2 hours, at least 3 hours, or at least 4 hours. In yet further embodiments, the fiber-reinforced polymer composite is not held at the second elevated temperature, but instead the second elevated temperature is reached and cooling begins substantially immediately.

In one or more embodiments, the carbon-carbon composite represents the fiber-reinforced polymer composite which has been heated to carbonize the cured chemical formulation and generate a material comprised substantially of carbon. The carbonization of the fiber-reinforced polymer composite results in a material having voids where the chemical formulation serving as the resin carbonized to occupy less volume. These voids represent the void space within the carbon-carbon composite. It will be appreciated that a portion of the void space is located deep within the carbon-carbon composite and is thus sealed away from the surrounding atmosphere. However, at least a portion of the void space is in fluid communication with the surrounding atmosphere and is termed the accessible void space. The accessible void space in the carbon-carbon composite is a function of the starting fiber-reinforced polymer composite, the char yield of the polymer resin and imine-based reactive diluent used to form the uncured resin embedded composite, and the carbonization temperature utilized in formation of the same.

In one or more embodiments, the method of making a polymer composite further includes re-infusing the chemical formulation into the carbon-carbon composite and curing the newly infused chemical formulation at a third elevated temperature to generate a reinfused carbon-carbon composite. Re-infusion of the chemical formulation serving as the resin into the carbon-carbon composite allows the accessible void space in the carbon-carbon composite to be filled with the chemical formulation, thereby increasing the overall density.

As with the initial infusion of the chemical formulation into the carbon fiber reinforcement to form the uncured resin embedded composite, the carbon-carbon composite may be re-infused with the chemical formulation in accordance with any infusion technique known to those skilled in the art. For clarity, it is noted that any techniques and particulars of the infusion provided with regards to the initial infusion of the carbon fiber reinforcement are explicitly indicated as transferable to the infusion of the carbon-carbon composite with the chemical formulation serving as the resin.

In one or more embodiments, re-infusing the bis-Schiff base resin into the carbon-carbon composite is conducted with a pressure differential between the carbon-carbon composite and the source of the chemical formulation. In one or more embodiments, a positive pressure is applied to drive the chemical formulation into the carbon-carbon composite. In further embodiments, a vacuum is applied at the carbon-carbon composite to draw the chemical formulation into the carbon-carbon composite.

In one or more embodiments, curing the newly infused chemical formulation within the reinfused carbon-carbon composite at the third elevated temperature is completed under vacuum. As noted with regards to the curing of the the uncured resin embedded composite at the first elevated temperature, curing the carbon-carbon composite reinfused with the chemical formulation draws air out of the carbon-carbon composite and allows the chemical formulation serving as the resin to maximally fill any voids in the carbon-carbon. Specifically, the carbon-carbon composite is retained in the vacuum enclosure where a vacuum is applied to evacuate air from the carbon-carbon composite. Generation of a vacuum environment by evacuating air from within the vacuum enclosure ensures that the reinfused carbon-carbon composite is substantially fully evacuated of air prior to elevating the temperature to the third elevated temperature to cure the chemical formulation.

The carbon-carbon composite reinfused with the chemical formulation is cured at the third elevated temperature. In one or more embodiments, where the same chemical formulation is used throughout the method, the first elevated temperature and the third elevated temperature may be substantially the same. Similarly, it will be appreciated that if different chemical formulations are used for each infusion and/or reinfusion, the first elevated temperature and the third elevated temperature may be distinct to align with the specific curing parameters of the particular chemical formulation utilized for each infusion.

In one or more embodiments, a breather cloth is placed over the carbon-carbon composite when placed under the vacuum enclosure. As previously noted, the breather cloth generally allows passage of gases from the carbon-carbon composite to a vacuum port where air and gases are removed from the vacuum enclosure. In the absence of a breather cloth the vacuum bag of the vacuum enclosure may be pressed against the carbon-carbon composite thereby impeding passage of gases to the vacuum port.

It will be appreciated that the strength of the vacuum generated within the vacuum enclosure is desirably as great as possible. In various embodiments, the vacuum applied to the vacuum enclosure to evacuate air from within the vacuum enclosure and the carbon-carbon composite is 25 inHg or greater, 26 inHg or greater, 27.5 inHg or greater, or 29 inHg or greater.

In one or more embodiments, the method of making a polymer composite further includes heating the reinfused carbon-carbon composite at a fourth elevated temperature to form a densified carbon-carbon composite. As with heating the fiber-reinforced polymer composite at the second elevated temperature, heating the reinfused carbon-carbon composite at the fourth elevated temperature carbonizes the chemical formulation in the reinfused carbon-carbon composite. In one or more embodiments, heating the reinfused carbon-carbon composite at the fourth elevated temperature to carbonize the cured chemical formulation is completed in an inert gas environment. In various embodiments the inert gas provided in the inert gas environment may be nitrogen or argon. In one or more embodiments, the inert gas environment comprises a nitrogen atmosphere of at least 99% purity by volume. In one or more embodiments, the inert gas environment comprises an argon atmosphere of at least 99% purity by volume. Specifically, the air atmosphere in the oven or autoclave where carbonization is completed may be evacuated and replaced with the inert gas environment, such as a nitrogen gas atmosphere, for heating to carbonize the cured chemical formulation in the reinfused carbon-carbon composite. As previously indicated, the inert gas environment results in carbonization of the cured chemical formualtion, but protects the resulting carbonized material from oxidation and further decomposition to carbon dioxide.

In one or more embodiments, carbonization is achieved by heating the reinfused carbon-carbon composite to a fourth elevated temperature of at least 800° C. In various further embodiments, the carbonization is achieved by heating the reinfused carbon-carbon composite to a fourth elevated temperature of between 800° C. and 2200° C., 900° C. and 2200° C., 800° C. and 2000° C., 900° C. and 2000° C., 1000° C. and 2200° C., or 1000° C. and 2000° C. For example, the reinfused carbon-carbon composite may be heated to a forth elevated temperature of 1200° C. under a constant flow of argon gas to form the densified carbon-carbon composite.

In one or more embodiments, the reinfused carbon-carbon composite is held at the fourth elevated temperature to carbonize the cured chemical formulation serving as the resin for at least 1 hour. In various further embodiments, the hold time at the fourth elevated temperature is at least 90 minutes, at least 2 hours, at least 3 hours, or at least 4 hours. In yet further embodiments, the reinfused carbon-carbon composite is not held at the fourth elevated temperature, but instead the fourth elevated temperature is reached and cooling begins substantially immediately.

In accordance with one or more embodiments, the re-infusing of the chemical formulation into the carbon-carbon composite, curing, and subsequent heating to the fourth elevated temperature to carbonize the chemical formulation may be repeated. Specifically, the densified carbon-carbon composite may be reinfused with the chemical formulation, followed by curing and subsequent heating to the fourth elevated temperature to generated carbon-carbon composite which has been further densified. The densification of the graphitic carbon-carbon composite from the repeated re-infusing of the chemical formulation into the carbon-carbon composite, curing, and subsequent heating to the fourth elevated temperature to carbonize the chemical formulation serving as the resin generates a serial reduction in the accessible void space.

In one or more embodiments, the char yield of the carbon-carbon composite is greater than 50%. In various embodiments, the char yield of the carbon-carbon composite is greater than 55%, greater than 60%, greater than 65%, in the range of 60 to 80%, or in the range of 65 to 75%. For examples, the use of Formula (B) in the loading range of 18 wt % to 55 wt % with a bis-Schiff base resin in accordance with Formula (XL) resulted in char yield of the carbon-carbon composite in the range of 65% to 72%. The results compare very favorably with the char yield of 74% when using only the bis-Schiff base resin and no imine-based reactive diluent in making the carbon-carbon composite. Such minimal reduction in the char yield with additions of a reactive diluent is generally not attainable when other types of reactive diluents are used in making such composites. In one or more embodiments, the char yield of the carbon-carbon composite is within 10% of a char yield of a corresponding carbon-carbon composite formed in the absence of the imine-based reactive diluent.

It will be appreciated that char yield is defined as the percentage of solid material obtained at end of pyrolysis. Specifically, char yield is the mass of the carbon-carbon composite or the densified carbon-carbon composite divided by the mass of the fiber-reinforced polymer composite or the reinfused carbon-carbon composite respectively. A greater char yield means more of the original mass is retained and this less void space is generated during carbonization.

Having described the method of making a making a polymer composite from the disclosed chemical formulation, and more specifically inclusion of the imine-based reactive diluent in the chemical formulation, the benefits of such process over current technologies becomes apparent. For example, compared with the industry practice of reducing resin processing viscosity with general solvents, the use of the presently disclosed imine-based reactive diluent removes the additional processing step of solvent removal before curing the resin infused composite, which leads to time and labor savings. The elimination of the use of general solvent also reduces the generation of volatile organic compounds (VOCs) and chance of defects in the cured composite resulting from incomplete removal of solvent.

Having described various embodiments, it should be understood that the various aspects of the chemical formulation and the method of making a polymer composite may be utilized in conjunction with various other aspects.

In a first aspect, the disclosure provides a chemical formulation. The chemical formulation comprises at least one polymer resin, the polymer resin selected from selected from the group consisting of bis-Schiff base resins, phthalonitrile resins, benzoxazine resins, polyimide resins, phenolic resins, bismaleimide resins, polyether sulfone, and polyether ether ketone; and an imine-based reactive diluent comprising the structure of Formula (A) wherein $R_{10}$ consists of an aliphatic moiety or a hydrogen, and $R_{11}$ consists of an aliphatic moiety or a hydrogen.

In a second aspect, the disclosure provides the chemical formulation of the first aspect, in which the imine-based reactive diluent is selected from Formula (B), Formula (C), Formula (D), Formula (E), Formula (F), Formula (G), Formula (H), Formula (J), or Formula (K).

In a third aspect, the disclosure provides the chemical formulation of the first or second aspect, in which the chemical formulation comprises from 5 wt % to 55 wt % of the imine-based reactive diluent.

In a fourth aspect, the disclosure provides the chemical formulation of any of the first through third aspects, in which the polymer resin is a thermosetting resin selected from selected from the group consisting of bis-Schiff base resins, phthalonitrile resins, benzoxazine resins, polyimide resins, phenolic resins, and bismaleimide resins.

In a fifth aspect, the disclosure provides the chemical formulation of any of the first through third aspects, in which the polymer resin is a thermoplastic resin selected from selected from the group consisting of polyether sulfone, and polyether ether ketone.

In a sixth aspect, the disclosure provides the chemical formulation of any of the first through fifth aspects, in which the chemical formulation comprises a viscosity of less than 10,000 cP (10 Pa-s) at 65° C.

In a seventh aspect, the disclosure provides the chemical formulation of any of the first through sixth aspects, in which the chemical formulation comprises a viscosity of less than 1,000 cP (1 Pa-s) at 100° C.

In an eighth aspect, the disclosure provides a method of making a polymer composite. The method comprises (a) infusing a chemical formulation into a carbon fiber reinforcement to form an uncured resin embedded composite, wherein the chemical formulation comprises: at least one polymer resin, the polymer resin selected from selected from the group consisting of bis-Schiff base resins, phthalonitrile resins, benzoxazine resins, polyimide resins, phenolic resins, bismaleimide resins, polyether sulfone, and polyether ether ketone; and an imine-based reactive diluent comprising the structure of Formula (A) wherein: $R_{10}$ consists of an aliphatic moiety or a hydrogen, and $R_{11}$ consists of an aliphatic moiety or a hydrogen; and (b) curing the uncured resin embedded composite at a first elevated temperature under vacuum or pressure to form a fiber-reinforced polymer composite.

In a ninth aspect, the disclosure provides the method of the eighth aspect, in which the method further comprises (c) heating the fiber-reinforced polymer composite at a second elevated temperature under inert atmosphere to carbonize the fiber-reinforced polymer composite and form a carbon-carbon composite, wherein the second elevated temperature is greater than the first elevated temperature.

In a tenth aspect, the disclosure provides the method of the ninth aspect, in which the method further comprises (d) re-infusing the chemical formulation into the carbon-carbon composite resulting from step (c) and curing the newly infused chemical formulation under vacuum at a third elevated temperature to generate a reinfused carbon-carbon composite; and (e) heating the reinfused carbon-carbon composite resulting from step (d) at a fourth elevated temperature under inert gas to densify the resulting reinfused carbon-carbon composite from step (d) and form a densified carbon-carbon composite In an eleventh aspect, the disclosure provides the method of the tenth, in which the steps (d) and (e) are repeated at least one time with the densified carbon-carbon composite previously generated in step (e) provided in lieu of the carbon-carbon composite in step (d) to further densify the polymer composite.

In a twelfth aspect, the disclosure provides the method of any of the tenth or eleventh aspect, in which the first elevated temperature and the third elevated temperature are substantially the same.

In a thirteenth aspect, the disclosure provides the method of any of the tenth through twelfth aspects, in which the second elevated temperature and the fourth elevated temperature are substantially the same.

In a fourteenth aspect, the disclosure provides the method of any of the eighth through thirteenth aspects, in which the second elevated temperature is at least 800° C.

In a fifteenth aspect, the disclosure provides the method of any of the eighth through fourteenth aspects, in which the fourth elevated temperature is at least 800° C.

In a sixteenth aspect, the disclosure provides the method of any of the eighth through fifteenth aspects, in which the carbon fiber reinforcement is unidirectional fibers, woven fabric, braided fabric, or a three-dimensional carbon fiber weave.

In a seventeenth aspect, the disclosure provides the method of any of the eighth through sixteenth aspects, in which the imine-based reactive diluent is selected from Formula (B), Formula (C), Formula (D), Formula (E), Formula (F), Formula (G), Formula (H), Formula (J), or Formula (K).

In an eighteenth aspect, the disclosure provides the method of any of the eighth through seventeenth aspects, in which the chemical formulation comprises from 5 wt % to 55 wt % of the imine-based reactive diluent.

In a nineteenth aspect, the disclosure provides the method of any of the eighth through eighteenth aspects, in which the polymer resin is a thermosetting resin selected from selected from the group consisting of bis-Schiff base resins, phthalonitrile resins, benzoxazine resins, polyimide resins, phenolic resins, and bismaleimide resins.

In a twentieth aspect, the disclosure provides the method of any of the eighth through eighteenth aspects, in which the polymer resin is a thermoplastic resin selected from selected from the group consisting of polyether sulfone, and polyether ether ketone.

In a twenty-first aspect, the disclosure provides the method of any of the eighth through twentieth aspects, in which the chemical formulation comprises a viscosity of less than 10,000 cP (10 Pa-s) at 65° C.

In a twenty-second aspect, the disclosure provides the method of any of the eighth through twenty-first aspects, in which the chemical formulation comprises a viscosity of less than 500 cP (0.5 Pa-s) at 100° C.

In a twenty-third aspect, the disclosure provides the method of any of the ninth through twenty-second aspects, in which a char yield of the carbon-carbon composite is within 10% of a char yield of a corresponding carbon-carbon composite formed in the absence of the imine-based reactive diluent.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

As used throughout, the singular forms "a," "an" and "the" include plural referents unless the context clearly dictates otherwise. Thus, for example, reference to "a" component includes aspects having two or more such components, unless the context clearly indicates otherwise.

It should be understood that any two quantitative values assigned to a property or measurement may constitute a range of that property or measurement, and all combinations of ranges formed from all stated quantitative values of a given property or measurement are contemplated in this disclosure.

As used here and in the appended claims, the words "comprise," "has," and "include" and all grammatical variations thereof are each intended to have an open, non-limiting meaning that does not exclude additional elements or steps.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A chemical formulation comprising:
   at least one polymer resin, the polymer resin selected from the group consisting of bis-Schiff base resins, phthalonitrile resins, benzoxazine resins, polyimide resins, phenolic resins, bismaleimide resins, polyether sulfone, and polyether ether ketone; and
   an imine-based reactive diluent comprising the structure of Formula (A):

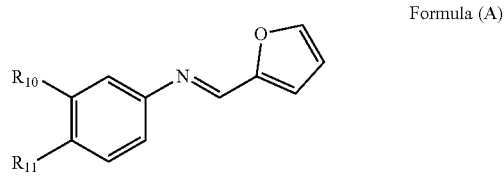

Formula (A)

wherein:
   $R_{10}$ consists of an aliphatic moiety or a hydrogen, and
   $R_{11}$ consists of an aliphatic moiety or a hydrogen.

2. The chemical formulation of claim 1, where the imine-based reactive diluent is selected from Formula (B), Formula (C), Formula (D), Formula (E), Formula (F), Formula (G), Formula (H), Formula (J), or Formula (K):

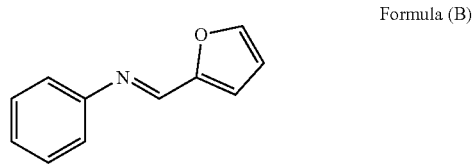

Formula (B)

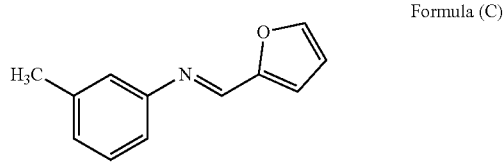

Formula (C)

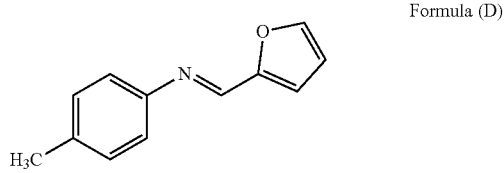

Formula (D)

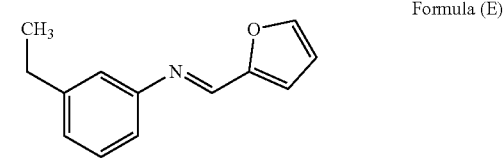

Formula (E)

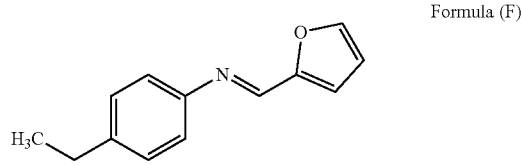

Formula (F)

-continued

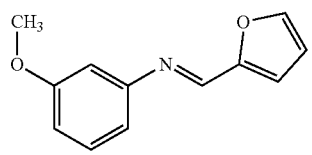
Formula (G)

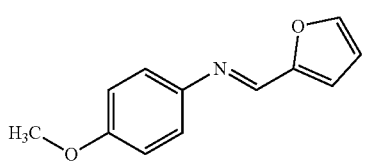
Formula (H)

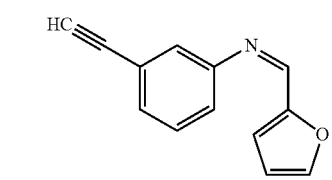
Formula (J)

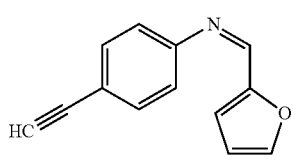
Formula (K)

3. The chemical formulation of claim 1, where the chemical formulation comprises from 5 wt % to 55 wt % of the imine-based reactive diluent.

4. The chemical formulation of claim 1, where the polymer resin is a thermosetting resin selected from the group consisting of bis-Schiff base resins, phthalonitrile resins, benzoxazine resins, polyimide resins, phenolic resins, and bismaleimide resins.

5. The chemical formulation of claim 1, where the polymer resin is a thermoplastic resin selected from the group consisting of polyether sulfone, and polyether ether ketone.

6. The chemical formulation of claim 1, where the chemical formulation comprises a viscosity of less than 10,000 cP (10 Pa-s) at 65° C.

7. The chemical formulation of claim 1, where the chemical formulation comprises a viscosity of less than 1,000 cP (1 Pa-s) at 100° C.

8. A method of making a polymer composite comprising the steps of:
   a) infusing a chemical formulation into a carbon fiber reinforcement to form an uncured resin embedded composite, wherein the chemical formulation comprises:
      at least one polymer resin, the polymer resin selected from the group consisting of bis-Schiff base resins, phthalonitrile resins, benzoxazine resins, polyimide resins, phenolic resins, bismaleimide resins, polyether sulfone, and polyether ether ketone; and
      an imine-based reactive diluent comprising the structure of Formula (A):

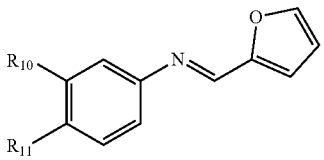
Formula (A)

wherein:
   $R_{10}$ consists of an aliphatic moiety or a hydrogen, and
   $R_{11}$ consists of an aliphatic moiety or a hydrogen; and
   b) curing the uncured resin embedded composite at a first elevated temperature under vacuum or pressure to form a fiber-reinforced polymer composite.

9. The method of claim 8, where the method further comprises:
   c) heating the fiber-reinforced polymer composite at a second elevated temperature under inert atmosphere to carbonize the fiber-reinforced polymer composite and form a carbon-carbon composite, wherein the second elevated temperature is greater than the first elevated temperature.

10. The method of claim 9, where the method further comprises:
    d) re-infusing the chemical formulation into the carbon-carbon composite resulting from step (c) and curing the newly infused chemical formulation under vacuum at a third elevated temperature to generate a reinfused carbon-carbon composite; and
    e) heating the reinfused carbon-carbon composite resulting from step (d) at a fourth elevated temperature under inert gas to densify the resulting reinfused carbon-carbon composite from step (d) and form a densified carbon-carbon composite.

11. The method of claim 10, where the steps (d) and (e) are repeated at least one time with the densified carbon-carbon composite previously generated in step (e) provided in lieu of the carbon-carbon composite in step (d) to further densify the polymer composite.

12. The method of claim 10, where the first elevated temperature and the third elevated temperature are the same and the second elevated temperature and the fourth elevated temperature are the same.

13. The method of claim 9, where the second elevated temperature is at least 800° C.

14. The method of claim 9, where a char yield of the carbon-carbon composite is within 10% of a char yield of a corresponding carbon-carbon composite formed in the absence of the imine-based reactive diluent.

15. The method of claim 8, where the carbon fiber reinforcement is unidirectional fibers, woven fabric, braided fabric, or a three-dimensional carbon fiber weave.

16. The method of claim 8, where the imine-based reactive diluent is selected from Formula (B), Formula (C), Formula (D), Formula (E), Formula (F), Formula (G), Formula (H), Formula (J), or Formula (K):

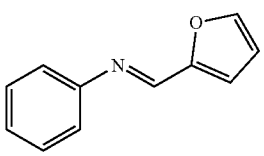
Formula (B)

-continued

Formula (C)
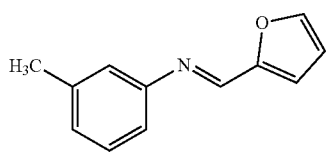

Formula (D)
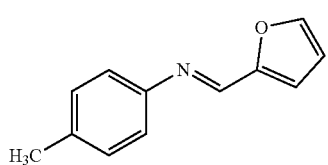

Formula (E)
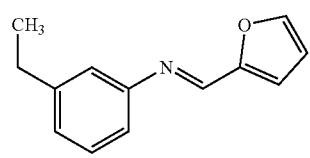

Formula (F)
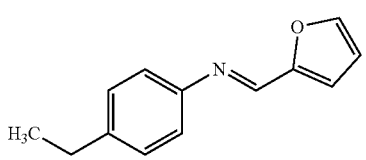

Formula (G)
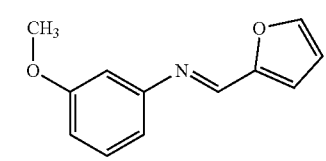

Formula (H)
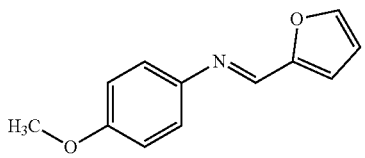

Formula (J)
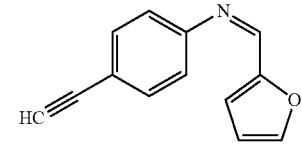

Formula (K)

17. The method of claim 8, where the chemical formulation comprises from 5 wt % to 55 wt % of the imine-based reactive diluent.

18. The method of claim 8, where the polymer resin is a thermosetting resin selected from the group consisting of bis-Schiff base resins, phthalonitrile resins, benzoxazine resins, polyimide resins, phenolic resins, and bismaleimide resins.

19. The method of claim 8, where the polymer resin is a thermoplastic resin selected from the group consisting of polyether sulfone, and polyether ether ketone.

20. The method of claim 8, where the chemical formulation comprises a viscosity of less than 10,000 cP (10 Pa-s) at 65° C.

21. The method of claim 8, where the chemical formulation comprises a viscosity of less than 500 cP (0.5 Pa-s) at 100° C.

* * * * *